United States Patent [19]
Ishida et al.

[11] Patent Number: 5,402,250
[45] Date of Patent: Mar. 28, 1995

[54] DOCUMENT PROCESSING SYSTEM

[75] Inventors: Koki Ishida, Hadano; Nozomi Sawada, Ebina; Hiroshi Tamura, Fujisawa; Yukikazu Mori, Ebina, all of Japan

[73] Assignee: Ricoh Company, Ltd., Tokyo, Japan

[21] Appl. No.: 199,962

[22] Filed: Feb. 22, 1994

Related U.S. Application Data

[63] Continuation of Ser. No. 833,789, Feb. 12, 1992, abandoned.

[30] Foreign Application Priority Data

Feb. 14, 1991 [JP] Japan ................. 3-040797

[51] Int. Cl.$^6$ ............................. H04N 1/387
[52] U.S. Cl. ..................... 358/448; 358/452; 358/453
[58] Field of Search ............... 358/448, 449, 450, 452, 358/453, 455; 395/129, 130, 132, 134; 382/57, 61

[56] References Cited

U.S. PATENT DOCUMENTS

| | | | |
|---|---|---|---|
| 4,750,044 | 6/1988 | Nakajima | 358/452 |
| 4,807,020 | 2/1989 | Hirosawa et al. | 358/448 |
| 4,905,097 | 2/1990 | Watanable | 358/448 |
| 5,075,787 | 12/1991 | Shaughnessy et al. | 358/448 |
| 5,130,924 | 7/1992 | Barker et al. | 364/419 |
| 5,138,465 | 8/1992 | Ng et al. | 358/453 |
| 5,173,853 | 12/1992 | Kelly et al. | 364/419 |
| 5,239,383 | 8/1993 | Ikeda et al. | 358/448 |

OTHER PUBLICATIONS

Yamada, Trial development of multimedia document processor, summer 1990, Japan, pp. 32–35.

*Primary Examiner*—Richard E. Chilcot, Jr.
*Assistant Examiner*—Rafael Bacares
*Attorney, Agent, or Firm*—Oblon, Spivak, McClelland, Maier & Neustadt

[57] ABSTRACT

A document processing system which is capable of forming an open document architecture (ODA) document and processing document information related to the ODA document, where each page of the ODA document is made up of one or a plurality of blocks in which character information, raster information or geometric information is arranged. The document processing system includes a first part for generating a raster block when a predetermined character modification function is used to modify a character which is to be displayed by superimposing a predetermined pattern on the character, where the raster block includes block position information corresponding to a display range of the predetermined pattern and raster data for displaying the predetermined pattern as a text unit, and a second part for adding the raster block generated by the first means to the document information.

10 Claims, 4 Drawing Sheets

GENERIC ELEMENTS ←→ SPECIFIC ELEMENTS

DOCUMENT PROCESSING SYSTEM

This application is a continuation of application Ser. No. 07/833,789, filed on Feb. 12, 1992, now abandoned.

BACKGROUND OF THE INVENTION

The present invention generally relates to document processing systems, and more particularly to a document processing system which can form an open document architecture document.

Documents which are processed in a telematique terminal equipment such as a mixed mode terminal equipment includes open document architecture (ODA) documents prescribed under CCITT Recommendation T.410 Series, processable mode documents prescribed under CCITT Recommendation T.502, mixed mode documents prescribed under CCITT Recommendation T.501 and the like.

The above documents basically have one page made up of one or a plurality of blocks, and character information, raster information or geometric information is arranged in each block. In addition, depending on the document mode, it is possible to provide control information so that two or more blocks can be processed collectively.

In the ODA document, the processable mode document and the mixed mode document, "no modification", "underline", no underline", "italic (character style)", "non-italic (character style)", "bold (character style)" and "no bold (character style)" are prescribed as standard functions for the modification of the graphic character displayed in character block. On the other hand, "variable pitch" and "fixed pitch" are prescribed as non-standard functions for the modification of the graphic character.

However, the following problems exist in the conventional document processing systems. That is, the mixed mode terminal equipment is generally expensive, and needs to be functionally distinguished from a relatively inexpensive Japanese-language word processor and the like. But as described above, in the mixed mode document which is formed by the mixed mode terminal equipment, there is no function of modifying the character such as providing a half-tone screen which is possible in the general Japanese-language word processor. For this reason, the lack of such modification function may delay the spread of the mixed mode terminal equipment which is otherwise extremely convenient and useful.

SUMMARY OF THE INVENTION

Accordingly, it is a general object of the present invention to provide a novel and useful document processing system in which the problems described above are eliminated.

Another and more specific object of the present invention is to provide a document processing system capable of forming an open document architecture (ODA) document and processing document information related to the ODA document, where each page of the ODA document is made up of one or a plurality of blocks in which character information, raster information or geometric information is arranged. The document processing system includes first means for generating a raster block when a predetermined character modification function is used to modify a character which is to be displayed by superimposing a predetermined pattern on the character, where the raster block includes block position information corresponding to a display range of the predetermined pattern and raster data for displaying the predetermined pattern as a text unit, and second means, coupled to the first means, for adding the raster block generated by the first means to the document information. According to the document processing system of the present invention, the character modification function such as the half-tone screen can be realized by superimposing a block of the half-tone screen pattern. For this reason, it is possible to substantially improve the character modification function of the ODA documents such as processable mode documents and mixed mode documents which are processed in a telematique terminal equipment.

Other objects and further features of the present invention will be apparent from the following detailed description when read in conjunction with the accompanying drawings.

DESCRIPTION OF THE PREFERRED EMBODIMENTS

Figure 1:
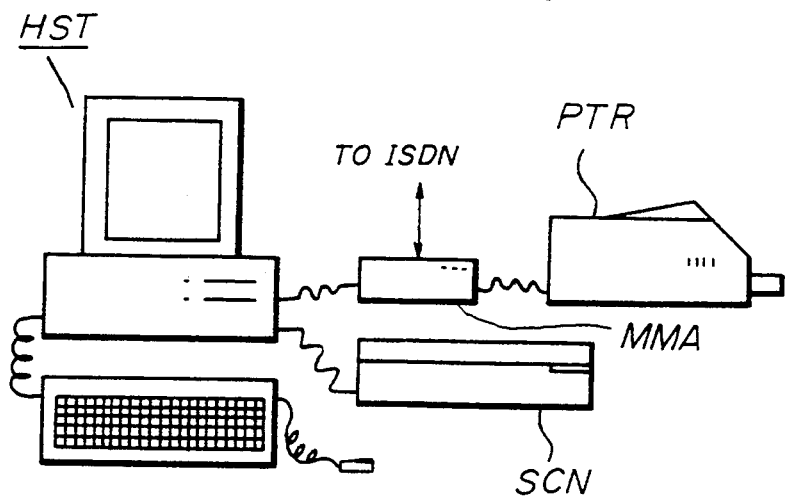
FIG. 1 is a diagram showing an embodiment of a document processing system according to the present invention provided with the functions of a mixed mode terminal equipment.

FIG. 1 shows an embodiment of a document processing system according to the present invention provided with the functions of a mixed mode terminal equipment. In this embodiment, the present invention is applied to a data processing system, and an integrated services digital network (ISDN) is used as the transmission path.

The data processing system shown in FIG. 1 includes a host equipment HST, a scanner SCN, a mixed mode communication adapter MMA, and a page printer PTR. The host equipment HST is made up of a personal computer system. The scanner SCN reads a document image. The mixed mode communication adapter MMA is used to realize mixed mode communication functions. The scanner SCN and the mixed mode communication adapter MMA are connected to the host equipment HST. The page printer PTR is made up of a laser printer or the like and is connected to the mixed mode communication adapter MMA.

Figure 2:
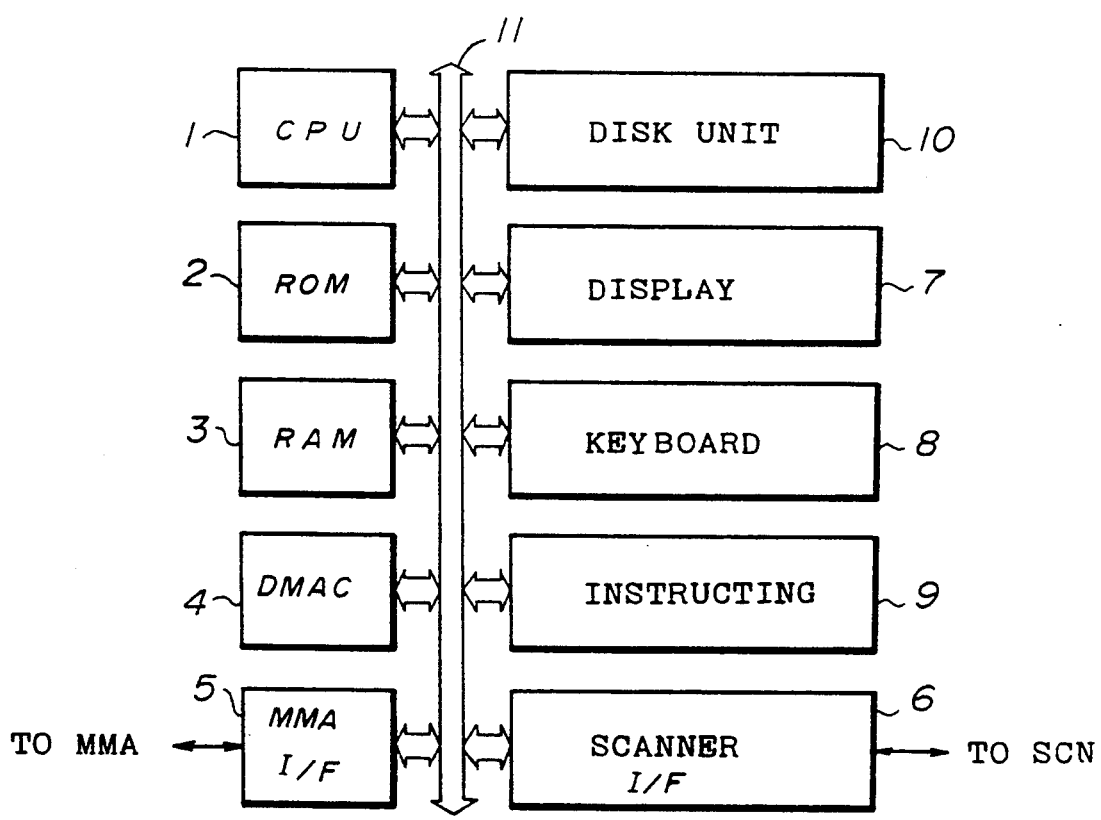
FIG. 2 is a system block diagram showing an embodiment of a host equipment shown in FIG. 1.

The host equipment HST has the functions of forming document data of mixed mode data, and carrying out other data processings. FIG. 2 shows an embodiment of the host equipment HST.

In FIG. 2, a central processing unit (CPU) 1 carries out an operation control process of the host equipment HST. A read only memory (ROM) 2 stores processing programs which are executed by the CPU 1 and various data which are used when executing the processing programs. A random access memory (RAM) 3 forms a work area of the CPU 1.

A direct memory access controller (DMAC) 4 realizes a DMA function so as to transfer data directly between elements of the host equipment HST. A MMA interface circuit 5 is coupled to the mixed mode communication adapter MMA and exchanges data therewith. A scanner interface circuit 6 is coupled to the scanner SCN and exchanges therewith image data read by the scanner SCN and the like.

A screen display unit 7 displays various information on the screen when an operator uses the host equipment HST. A keyboard unit 8 is manipulated by the operator to input various data. A screen instructing unit 9 carries out various operations such as instructing a coordinate on the screen which is displayed on the screen display unit 7. A man-machine interface function is realized between the operator and the host equipment HST by the screen display unit 7, the keyboard unit 8 and the screen instructing unit 9.

A magnetic disk unit 10 stores various data including processing programs such as operating system and application programs of the host equipment HST, and data files such as mixed mode documents which are formed.

The CPU 1, the ROM 2, the RAM 3, the DMAC 4, the MMA interface circuit 5, the scanner interface circuit 6, the screen display unit 7, the keyboard unit 8, the screen instructing unit 9 and the magnetic disk unit 10 are coupled to a system bus 11. The data exchange among these elements of the host equipment HST is mainly made via the system bus 11. In addition, the DMA transfer function of the DMAC 4 is used when transferring the data at a high speed.

Hereafter, an application program for forming a mixed mode document will be referred to as a mixed mode editer. When the operator starts the mixed mode editer in order to form the mixed mode document, it is possible to form a document shown in FIG. 3A, for example, using this mixed mode editer.

In this case, the mixed mode document is made up of one page, and this one page is made up of blocks B1, B2 and B3. Character information is arranged in the block B1, raster information is arranged in the block B2, and geometrical information is arranged in the block B3.

Figures 3A, 3B, 3C:
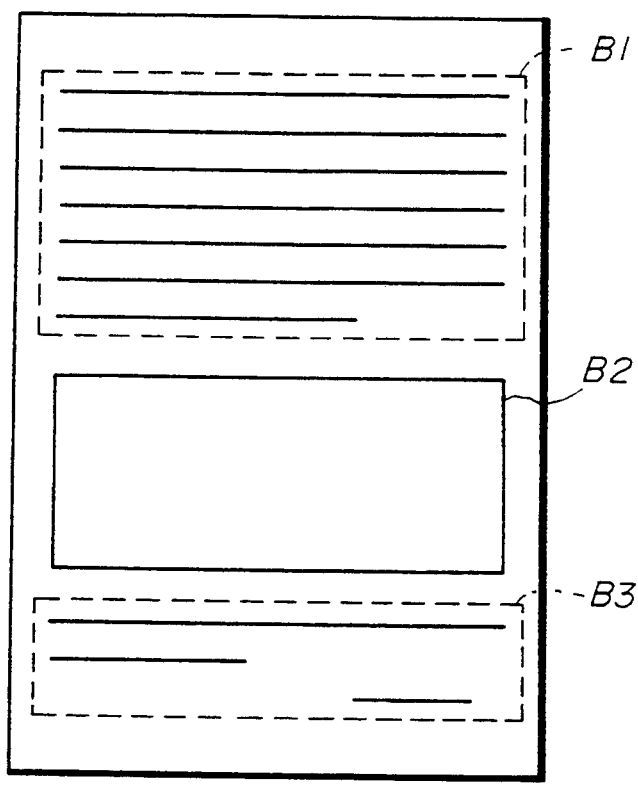
FIGS. 3A through 3C are diagrams for explaining a mixed mode document used in the embodiment.

In addition, it is possible to make an arbitrary character modification with respect to a character or character string of the block B1, for example. The character modification may be to provide a half-tone screen with respect to a specific character string as shown in FIG. 3B, or to provide cancel (or ignore) lines over the specific character string as shown in FIG. 3C. Furthermore, the character modification may be to change the pitch of the characters or the pitch of the lines.

Basically, the character modification is made by superimposing on the display a separate block B4 shown in FIG. 3B, for example, on the character or character string which is to be subjected to the character modification. The region in which the character modification is to be made matches the region of this block B4, and this block B4 includes as the raster information specific patterns such as the half-tone screen and the cancel lines.

According to this embodiment, if the character modification made by the operator using the mixed mode editer is a mode (hereinafter referred to as a special modification function) not prescribed under the character modification function of the mixed mode document, a block is newly generated and added to the mixed mode document. The region of this newly generated block matches the region in which the character modification is to be made, and this block includes as the raster information patterns corresponding to the specified special modification function.

Figure 4:
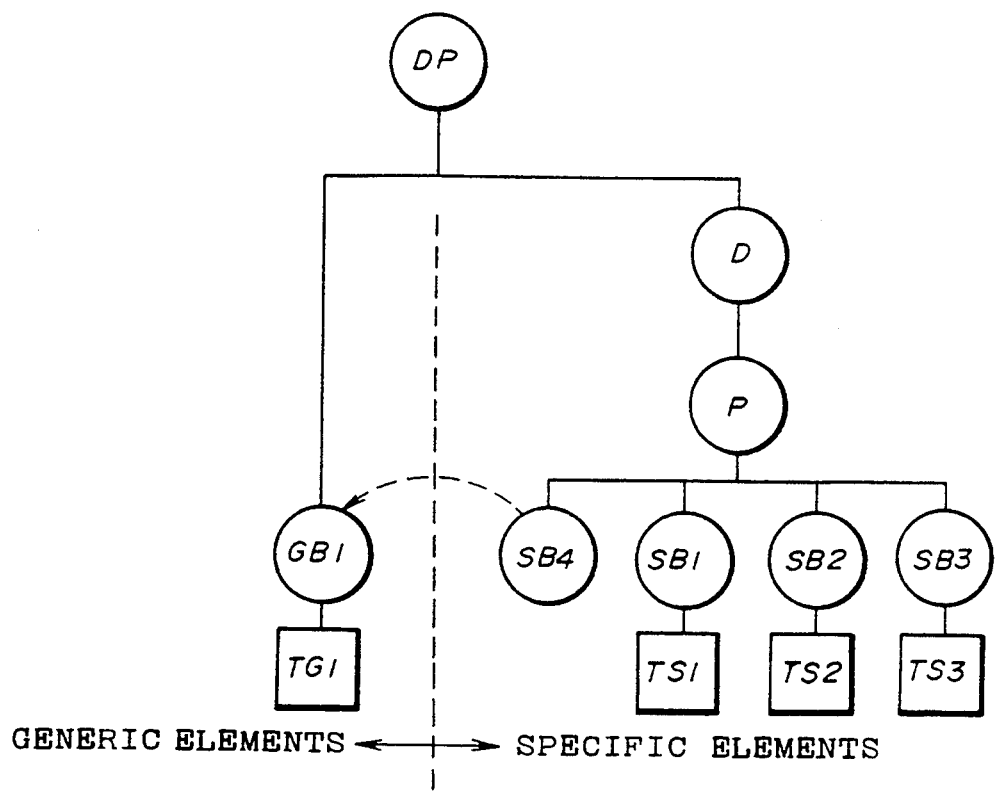
FIG. 4 is a diagram for explaining the structure of the mixed mode document.

In other words, the document structure of the mixed mode documents shown in FIGS. 3A and 3B may be represented by the diagram shown in FIG. 4.

In FIG. 4, document profile information DP describes the entire structure of this document. A document layout descriptor D describes the page structure of the specific elements, and a page layout descriptor P describes the block structure amounting to one page. Block layout descriptors SB1, SB2 and SB3 respectively describe position information and attribute information of the blocks B1, B2 and B3. Text units TS1, TS2 and TS3 respectively are made up of data describing display contents of the blocks B1, B2 and B3.

In addition, a block layout descriptor SB4 describes position information and attribute information of the block B4 in the region where the half-tone screen is provided. In this case, the block layout descriptor SB4 refers to a block layout descriptor GB1 which is a generic element. The block layout descriptor GB1 describes position information and attribute information of a text unit TG1 which is made up of character modification pattern data of the block B4 and is defined as the generic element.

Hence, in this embodiment, the generic block made up of the character modification pattern data is generated, and a reference is made to this generic block as the contents of the block which is made up of the patterns of the character modification region.

Figure 5A:
FIGS. 5A through 5C are diagrams for explaining a generation of a half-tone screen block.
Figure 5B:
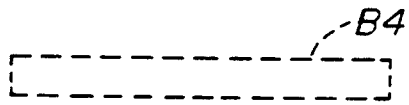

In other words, a generic block GB is newly generated, and this generic block GB is made up of half-tone screen pattern data occupying a region greater than the region of the block B4 which is to be subjected to the half-tone screen character modification, as may be seen from FIGS. 5A and 5B. The block B4 is defined so as to make reference to this generic block GB.

In the mixed mode document, when a specific block makes reference to the generic block, it is prescribed that the contents of the specific block are used as region information related to the position, size and the like. In addition, it is prescribed that the text unit of the generic block is used.

Figure 5C:
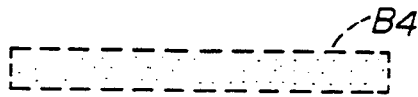

Accordingly, in this case, the block B4 is displayed as shown in FIG. 5C in the document which is displayed/output on the receiving end. As may be seen from FIG. 5C, the position and size of the block layout descriptor SB4 are used for the block B4, and the contents of the text unit TG1 of the generic block GB are displayed in the region of the block B4. As a result, it is possible to obtain a document in which the specified half-tone screen is provided on the specific character sequence of the block B4.

For the part where the special modification function is used, the display pattern data corresponding to the special modification function is registered in the generic block. In the specific block, only the layout information related to the region in which the special modification function is used is prescribed, and a reference is made to the generic block of the display pattern data corresponding to the special modification function. For this reason, compared to the case where the parts in which the special modification function is used are described as independent specific blocks, it is possible to reduce the data quantity of the display pattern data. Consequently, it is possible to reduce the quantity of data to be transmitted and thus reduce the communication time.

Figure 6:
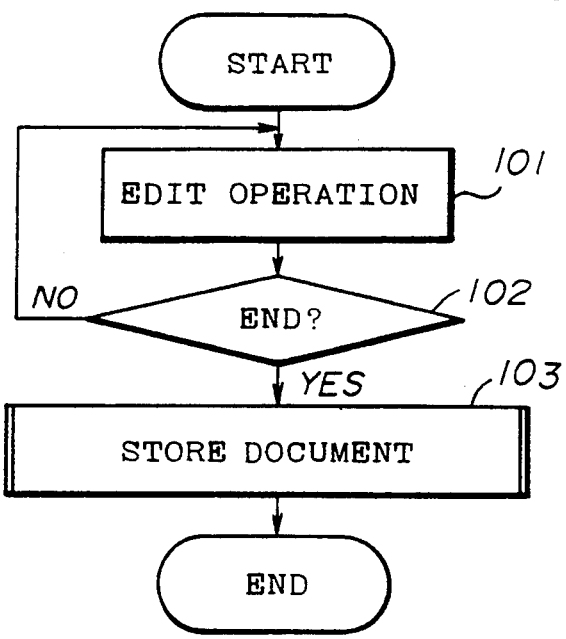
FIG. 6 is a flow chart for explaining a process of a mixed mode editer.

FIG. 6 shows an operation of the mixed mode editer. Step 101 illustrates an edit operation, and in step 102 it is decided whether or not the edit operation has ended. If the decision result in the step 102 is YES, step 103 stores the document and the process ends. Hence, the appropriately specified edit operation is carried out until the operator selects the end of operation, and when the end of operation is selected, the mixed mode document which is formed is stored in the magnetic disk unit 10.

Figure 7:
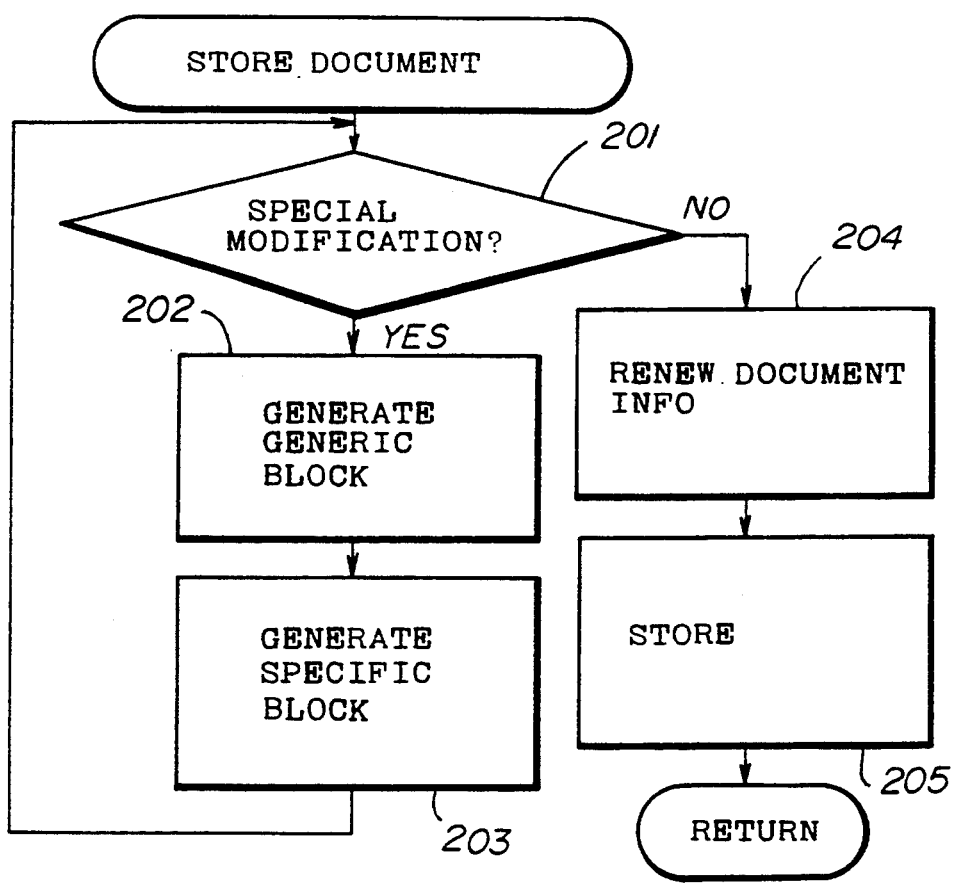
FIG. 7 is a flow chart for explaining a document store process of the mixed mode editer.

FIG. 7 shows the document store process of the mixed mode editer, that is, step 103 shown in FIG. 6. As shown in FIG. 7, the block generating process related to the special modification function described above is also carried out during the document store process.

In FIG. 7, step 201 decides whether or not a region subjected to the special modification function exists within the document which is to be stored. If the decision result in step 201 is YES, step 202 generates a generic block having a size which occupies a region at least greater than a maximum region out of the regions in which the special modification function is applied and including as the display contents the display patterns corresponding to the special modification function. Then, step 203 generates a specific block which prescribes only layout information related to the region in which the special modification function is applied. The process returns to step 201 after step 203, so that the above described process is carried out for each region in which each special modification function is applied. If there are a plurality of regions in which the same special modification function is applied, one generic block is generated for these regions.

After the new blocks are generated and the decision result in step 201 becomes NO, step 204 renews the mixed mode document into a format which includes the generated blocks. Thereafter, step 205 stores the mixed mode document after the renewal into the magnetic disk unit 10.

Therefore, according to this embodiment, for the character modification function which is not prescribed under the CCITT Recommendations, a block made up of the display patterns for realizing this character modification function is newly generated. This newly generated block is superimposed on the region in which the character modification function is to be applied. Since the function used in this embodiment is the standard function of the mixed mode document, it is possible to reproduce a mixed mode document which uses a more versatile character modification function at the receiving end without the need to provide special functions.

In the described embodiment, the present invention is applied to the mixed mode document. However, the present invention is similarly applicable to the ODA documents in general including the processable mode documents. In addition, the present invention is similarly applicable to terminal equipments provided with the functions including the mixed mode terminal function, such as ODA terminal equipments.

Further, the present invention is not limited to these embodiments, but various variations and modifications may be made without departing from the scope of the present invention.

What is claimed is:

1. A document processing system capable of forming an open document architecture (ODA) document and processing document information related to the ODA document, each page of the ODA document being made up of one or a plurality of blocks in which character information or raster information is arranged, said document processing system comprising:
    first means for generating a raster block when a predetermined character modification is used to modify a character which is to be displayed by superimposing a predetermined pattern on the character, said raster block including block position information corresponding to a display range of the predetermined pattern and raster data for displaying the predetermined pattern as a text unit; and
    second means, coupled to said first means, for adding the raster block generated by said first means to the document information,
    wherein at least one predetermined character modification function is defined with respect to character modification, and if an undefined character modification is made with respect to a character information block, said undefined character modification is processed as raster information.

2. The document processing system as claimed in claim 1, wherein said first means generates the raster block in which the display range indicated by the position information matches a region in which the character modification is to be made.

3. The document processing system as claimed in claim 1, wherein the predetermined pattern indicated by the raster information is selected from a group consisting of a half-tone screen and cancel lines.

4. The document processing system as claimed in claim 1, wherein the predetermined character modification function is a (mode other than modes prescribed by a character modification function of the ODA document.)

5. The document processing system as claimed in claim 1, wherein said first means includes:
    means for generating a generic block having a size which occupies a region at least greater than a maximum region out of regions in which the predetermined character modification function is applied and including as display contents display patterns corresponding to the predetermined character modification function, and
    means for generating a specific block which prescribes only layout information related to the region in which the predetermined character modification function is applied, said generic block and said specific block being generated for each region in which the predetermined character modification function is applied, wherein said generic block is used to define said predetermined character modification function for one or more of said regions to which the predetermined modification function is to be applied such that said predetermined modification function can be repeated at a plurality of portions within the ODA document and thereby eliminate the need to repeatedly generate said predetermined modification function.

6. The document processing system as claimed in claim 5, wherein said second means includes:
    means for renewing the document information to include a new block when a new block is generated by said first means, and means for storing the renewed document information.

7. The document processing system as claimed in claim 5, wherein if there are a plurality of regions within said ODA document in which the same predetermined character modification function is applied, one generic block is generated for these regions.

8. A document processing system capable of forming an open document architecture (ODA) document and processing document information related to the ODA document, each page of the ODA document being made of one or a plurality of blocks in which character information or raster information is arranged, said document processing system comprising:

means for generating one or more generic blocks, each of which is constituted by raster information corresponding to a predetermined data pattern;

means for retrieving a portion of one of said generic blocks for subsequent superimposition onto a portion of a selected one of said blocks in which character information is included, said character information being modified by said raster information included in said generic block, wherein the size of said portion of said generic block is equal to the size of said portion of said selected block of character information; and means for generating a specific block which indicates the size of said portion of said generic block to be superimposed onto said block of character information.

9. The document processing system according to claim 8, wherein said specific block indicates to the document processing system the location of said portion of said selected block of character information upon which said raster information included in said generic block is to be superimposed on.

10. The document processing system according to claim 8, wherein a plurality of different specific blocks are used to retrieve a predetermined data pattern from a single generic block when said predetermined data pattern is to be superimposed onto a plurality of different portions of a selected block of character information.

* * * * *